United States Patent

[11] 3,628,023

[72] Inventors Thomas L. Paoli
Chatham;
Jose E. Ripper, North Plainfield, both of N.J.
[21] Appl. No. 881,183
[22] Filed Dec. 1, 1969
[45] Patented Dec. 14, 1971
[73] Assignee Bell Telephone Laboratories, Incorporated
Berkeley Heights, N.J.

[54] METHOD AND APPARATUS FOR PULSE POSITION MODULATING SPONTANEOUSLY PULSING SEMICONDUCTOR LASERS
16 Claims, 3 Drawing Figs.

[52] U.S. Cl. .................................................. 250/199,
331/94.5, 332/7.51, 330/4.3
[51] Int. Cl. ...................................................... H04b 9/00,
H01s 3/18
[50] Field of Search ............................................ 250/199;
331/94.5; 332/7.51; 330/4.3

[56] References Cited
OTHER REFERENCES

Vallese et al., " Laser Telemeter....Application," U.S. Gov't Res. & Devel. Report, AD661312, Feb. 8, 1968 (avail. to public) 73p.

Vallese et al., " Laser Telemeter....Piece," U.S. Gov't Res. & Devel. Report, AD669627, Sept. 23, 1968, (avail. to public) 46p.

*Primary Examiner*—Ronald L. Wibert
*Attorneys*—R. J. Guenther and Arthur J. Torsiglieri ABSTRACT: The output of a spontaneously pulsing semiconductor laser is pulse position modulated by amplitude modulating the injection current while maintaining the frequency and power of the modulating signal so as to prevent phase-locking of the laser output to the modulating signal.

INVENTORS T. L. PAOLI
J. E. RIPPER
BY
A.J. Torsiglieri
ATTORNEY

METHOD AND APPARATUS FOR PULSE POSITION MODULATING SPONTANEOUSLY PULSING SEMICONDUCTOR LASERS

BACKGROUND OF THE INVENTION

This invention relates to apparatus and methods for modulating lasers and more particularly to apparatus and methods for pulse position modulating spontaneously pulsing semiconductor lasers.

In a paper entitled, "Coupled Longitudinal Mode pulsing in Semiconductor Lasers," *Phys. Rev. Letters*, 22, 1085 (May 26, 1969), we reported that continuously operating gaAs junction lasers, at suitable values of temperature and injection current, exhibit a self-induced or spontaneously pulsing effect; that is, they produce a train of light pulses at microwave repetition rates.

The self-induced pulsing is attributed to coupling among the longitudinal modes of the laser and the high dispersion of semiconductor materials. Thus, theory indicates that similar pulsing behavior is present in semiconductor lasers made of materials other than gallium arsenide and/or using pumping mechanisms other than injection through a junction.

In our copending application, T.L.Paoli-J.E.Ripper Case 1-2, U.S. Pat. Ser. No. 833,522, filed on June 16, 1969 and assigned to the assignee hereof, we disclosed methods and apparatus for pulse-position modulating the output of such a laser by phase-locking the pulsing laser output to a microwave signal added to the pump and then frequency modulating the microwave signal. Phase-locking was achieved when the frequency of the microwave signal and the repetition rate of the laser output were related to one another as the ratio of two integers.

It is an object of this invention to perform such pulse position modulation at rates comparable to the theoretical limit for carrying information of one-half the repetition rate.

It is another object of this invention to perform such pulse position modulation without the need for phase-locking the modulating signal to the laser output

SUMMARY OF THE INVENTION

It has been discovered, in accordance with an illustrative embodiment of the present invention, that the light pulses emitted by a spontaneously pulsing semiconductor laser can be position modulated by means of an information signal which directly amplitude modulates the injection current of the laser, provided, however, that the power and frequency of the information signal are maintained so as to prevent phase-locking of the laser output to the information signal. As the amplitude of the information signal changes, the repetition rate of the laser follows. Position modulation at rates up to one-half the repetition rate (typically from 250 to 1500 MHz) are possible without loss of information. This limit is related to the well-known criteria for maximum information carrying capacity which is achieved when the maximum frequency contained in the modulating signal is one-half the sampling rate. This effect is to be contrasted with amplitude modulation of the injection current of a conventional c.w. or pulsed semiconductor laser which produces amplitude modulation of the laser output and not pulse-position modulation. It should be further noted that since the laser of the present invention is spontaneously pulsing, the microwave signal need not produce the pulses and can produce position modulation with relatively low levels of microwave power.

BRIEF DESCRIPTION OF THE DRAWing

These and other objects of the invention, together with its various features and advantages, can be more easily understood from the following more detailed description taken in conjunction with the accompanying drawing, in which.

DETAILED DESCRIPTION

Figure 1:
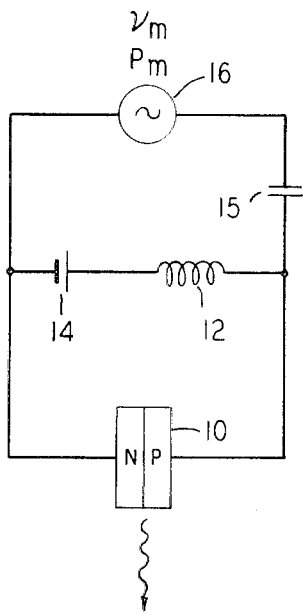
FIG. 1 is a schematic of in illustrative embodiment of the invention.

FIG. 1 is a schematic diagram of apparatus useful in modulating a PN-junction laser in accordance with the invention, comprising a PN-junction laser 10 (including, if necessary, a cooling arrangement not shown) coupled to both a DC voltage source 14 and a low power AC voltage source (i.e., an information source) 16 for amplitude modulating the injection current according to input information. In a simple arrangement, the laser is in parallel with both the DC voltage source 14 in series with an inductor 12 and the AC source 16 in series with a capacitor 15. The values of the inductance and capacitance of elements 12 and 15, respectively, are chosen to isolate the two voltages supplies from one another so that the total voltage drop across the laser is essentially equal to the sum of the voltages of the two sources.

The value of the DC voltage is chosen to produce self-induced pulsing in the output of the laser 10. This voltage typically depends on the particular laser and the temperature. For gallium arsenide junction lasers at liquid nitrogen temperatures, the voltage is typically that required to produce between 1.1 and 3 times the threshold current for lasing. The pulsing repetition rate is typically between 0.5 and 3 gigaHertz. The exact range of DC voltages producing pulsing for a particular laser can be determined empirically by varying the voltage, detecting the laser light with a photodiode and examining the diode output in a microwave spectrum analyzer. Once spontaneous pulsing is produced, the AC source 16 is adjusted to prevent phase-locking of the pulsing laser output to the AC modulating signal, as will be described hereinafter.

Figure 2:
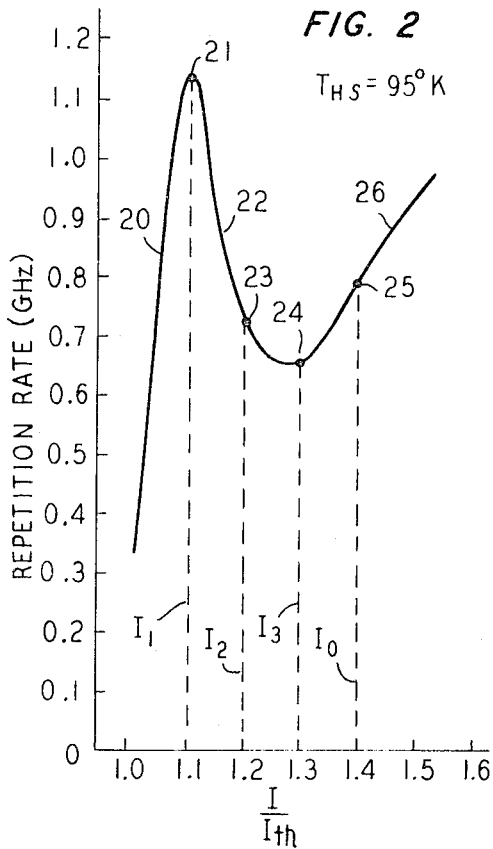
FIG. 2 is a graph of the repetition rate of the pulsing laser output versus current over threshold for a laser in accordance with the invention.

The variation of the frequency of the laser output pulsations with injection current I (from DC source 14) above the threshold current $I_{th}$, is shown in FIG. 2. In region 20, the modulation of the laser output is primarily noise induced. At peak 21 (current $I_1$) the modulation depth begins to increase, with the laser output being essentially sinusoidally modulated in the intermediate portion of region 22. At about point 23 (current $I_2$) the modulation depth reaches 100 percent, i.e., the laser output is spontaneously pulsing. At point 24 (current $I_3$) the slope of the curve changes from negative in region 22 to positive in linear region 26 where the laser output is still spontaneously pulsing. It is in region 26 that the operating point 25 (current $I_0 = 1.4 I_{th}$, illustratively) is chosen. Once this point is fixed, the modulation signal from AC source 16 is turned on, thereby causing the injection current to vary along the curve in accordance with the amplitude of the information signal from source 16. These variations in amplitude produce modulation of the repetition rate as previously described. At relatively small amounts of power (typically $P_m = 1$ mw.) modulation rates as high as half the pulse repetition rate of about 1.2 gigaHertz have been achieved.

The choice of operating point 25 in linear region 26 is advantageous because in this region the repetition rate of the laser output follows linearly (without harmonic distortion) the amplitude variations of the information signal. Although feasible, the choice of an operating point in a nonlinear region would generate harmonic frequencies and thus necessitate the use of electronic compensation equipment (well known in the art).

A further advantage is attained by increasing the slope of the region 26, i.e., the same amount of modulation of the repetition rate is obtained with a smaller modulation current swing, thereby reducing both the modulating power required and heating effects produced by high modulation current. In addition, increasing the slope reduces spurious amplitude modulation of the output pulses and also, by reducing the modulation power $P_m$, keeps the laser operation further from the phase-locking regions.

Since the region 26 is temperature dependent, the slope can be readily altered by changing the heatsink temperature. The direction of the change is determined empirically since increasing the temperature increases the slope in some diodes, whereas decreasing the temperature increases the slope in other diodes.

Figure 3:
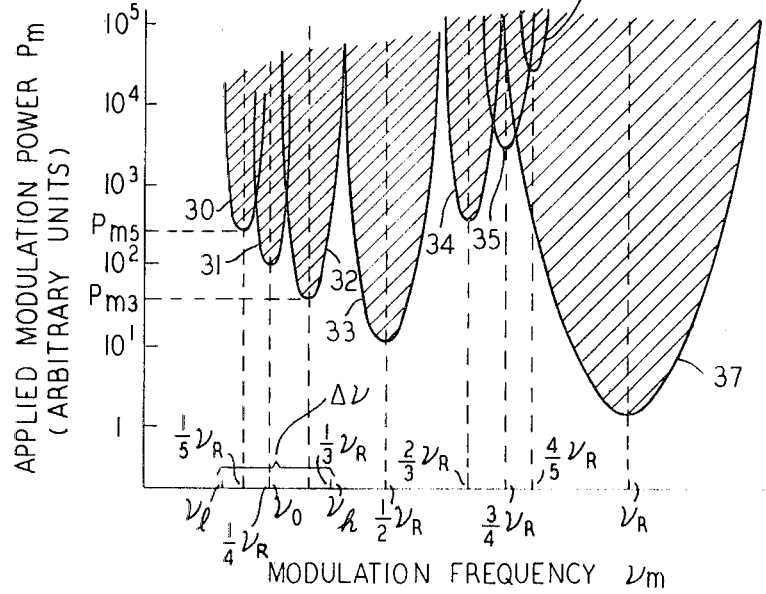
FIG. 3 is a graph of modulation power versus frequency showing the regions in which the laser output is phase-locked to the modulating signal.

The manner in which locking is prevented is best understood with reference to FIG. 3 which is a graph of the modulating signal power $P_m$ versus the modulating signal frequency $\nu_m$, and shows the regions in which the laser output (of repetition rate $\nu_R$) phase locks to the modulating signal. These phase-locking regions are located within the shaded areas of curves 30 to 37. Phase-locking occurs when when $\nu_m = N/M\nu_R$, where $N$ and $M$ are integers and $P_m$ exceeds a certain minimum power at that frequency. For example, at $\nu_m = 1/3\nu_R$, $P_m$ must be at least as great as $P_{m3}$ for phase-locking to occur. IF $\nu_m = 1/5\nu_R$, then for phase-locking to occur $P_m \geq P_{m5}$. Thus, the combination of values $(\nu_m, P_m)$ define a modulation parameter, a point on the graph of FIG. 3, which must lie outside of the shaded areas to prevent phase-locking.

In the case of an information signal of bandwidth $\Delta\nu$ extending from $\nu_l$ to $\nu_h$ and centered at $\nu_o$, phase-locking can be prevented by insuring that the power $P_m$ is below that required for the highest frequency of the form $1/M\nu_R$ contained within $\Delta\nu$. Thus, for the example shown, the frequencies of the form $1/M\nu_R$ within $\Delta\nu$ are $1/5\nu_R$, $1/4\nu_R$ and $1/3\nu_R$. The highest of these is $1/3\nu_R$. Therefore, to prevent phase phase-locking, $P_m$ is maintained less than $P_{m3}$.

It should be noted that the well-known principle, that the maximum information carrying capacity is achieved when the modulation frequency is one-half the sampling rate, dictates that the maximum frequency $\nu_h$ contained within the information band should be less than $1/2\nu_R$. If $\nu_h$ were greater than $2/3\nu_R$, for example, the sampling system would be unable to distinguish a sample at $1/3\nu_R$ from one at $2/3\nu_R$, hence no additional information capacity is obtained by having $\nu_h > 1/2\nu_R$.

A graph such as FIGs. 3 can be plotted for each operating point 25 (FIG. 2). Thus, the method in accordance with one aspect of our invention for preventing phase-locking is to select an operating point, varying the power and frequency of the modulating signal to produce the information of FIG. 3, determine the maximum frequency $\nu_h$ in the information signal of the form $1/M\nu_R$, measure the locking power at that frequency, and maintain $P_m$ less than that locking power.

As mentioned previously, theory indicates that spontaneous pulsing is present in semiconductor lasers made of material other than gaAs and/or using pumping mechanisms other than injection through a junction. The pulse repetition rate in such lasers can also be modulated by modulation of the pumping source. For example, in a semiconductor laser pumped by an electron beam, the information signal is applied to the beam, and in an optically pumped laser, the intensity of the optical pumping source is modulated at information signal rates.

While nearly every junction laser tested exhibited spontaneous pulsing for some region of current and temperature, the invention will become clearer by reference to the following specific example.

EXAMPLE 1

A gallium arsenide junction laser was fabricated in the following manner. An N-doped substrate was formed by growing a tellurium-doped crystal of gallium arsenide by the Czochralski method and slicing the crystal into wafers. The free electron concentration of the substrate was between 3 and 4.5×10$^{18}$ electrons per cubic centimeter. A P-doped region was diffused into the substrate using the well-known box method. With a source comprising a 2.0 percent solution of zinc in gallium saturated with gallium arsenide, the diffusion time was 4 hours at 800° C. The depth of the junction thus formed was about 1.8 microns.

The substrate was then heat treated. After a protective layer of about 950 angstroms of $SiO_2$ was applied, the substrate, along with a few milligrams of pure arsenic, was placed in a quartz ampul (having a volume of about 7 cubic centimeters). The ampul was evacuated to a pressure of $10^{-7}$ millimeters of mercury. The ampul was then heated 4 hours at 850° C. and quenched to 0° by immersion in ice water.

After the heat-treating step, the electrical contacts to the N- and P-regions of the diode were formed. Stripes having dimensions 25.4×380 microns were cut through the oxide on the P-doped region by photolithographic methods. A second diffusion was then carried out in order to make a good ohmic contact to the P-doped region. (This diffusion does not alter the original diffusion and is used only to make good contacts.) This step was carried out by the box method, using a pure zinc arsenic source and a diffusion time of 15 minutes at 650° C. This diffusion formed a heavily doped layer in the P-region with a thickness of less than 3,000 angstroms. A metal contact comprising 500 angstroms of titanium, 5,000 angstroms of silver, and 1,000 angstroms of gold was then applied to the P-region. The N-doped side was lapped down to a thickness of about 105 microns and a contact comprising 2,000 angstroms of tin, 4,000 angstroms of nickel and 4,000 angstroms of gold was applied. The substrate was then scribed and cleaved to form individual Fabry-Perot cavities having final dimensions on the order of 100×380×625 microns.

The finished laser was then mounted on a copper heat sink in a microwave package having a window so that light from the laser can emerge. The package was inserted as the termination of a 50 ohm transmission line, designed in accordance with well-known microwave techniques to provide good coupling of external microwave signals into the laser.

Over certain ranges of injection current (between one and two times threshold) at heatsink temperatures between 77° K. and 110° K., the light intensity from the above laser consisted of spontaneously generated pulses at repetition rates between 500 MHz and 1,200 MHz. For example, at a current of 670 ma. and a heatsink temperature of 96° K., pulses whose total width at the half-power point was approximately 400 psec. were generated at 620 MHz. Under these conditions, the maximum useful rate of pulse position modulation (i.e., 310 MHz) was achieved. As discussed before, rates higher than $1/2\nu_R$, although achievable, produce no additional information-carrying capacity.

It is understood that the above-described arrangements are merely illustrative of the many possible specific embodiments which can be devised to represent application of the principles of the invention Numerous and varied other arrangements can be devised in accordance with these principles by those skilled in the art without departing from the spirit and scope of the invention.

In particular, the embodiment of FIG. 1 can readily be combined with electro-optic, purely optical or purely electrical feedback means, as described in our copending application, T. L. Paoli-J. E. Ripper Case 5–6, U.S. Pat. Ser. No. 881,184, filed on Dec. 1, 1969, and assigned to the assignee hereof, in order to narrow the pulse width and stabilize the repetition rate of the spontaneously pulsing laser output. For example, using electro-optic feedback (i.e., the output of a photodiode, which detects the laser pulses, is amplified and fed back into the laser injection current) applied to a spontaneously pulsing laser (current 489 ma., heatsink temperature 95° K. and repetition rate 790 MHz) reduced the pulse width from 400 picoseconds to less than 200 picoseconds and reduced the linewidth from 1,500 kHz. to less than 100 kHz.

Furthermore, a plurality of lasers in accordance with the present invention can be incorporated in a multiplex communication system by locking the average phase of intensity modulation of the optical outputs of each laser to each other and then interleaving the optical pulses of separate channels by means well know in the art.

An optical receiver for use in such a system could include a very fast photodiode or an array of such diodes. Advantageously the diodes could be P-I-N photodiodes or Schottky barrier photodiodes.

In addition to multiplexing in this manner, it is also clear that a second dimension of multiplexing can be introduced by using lasers having different frequencies of light. At the receiver the different frequencies can be separated by spectrographic techniques and the pulses detected by photodiodes.

What is claimed is:

1. A method for pulse position modulating a semiconductor laser comprising the steps of:
   inducing spontaneous pulsing at a repetition rate $\nu_R$ in the laser by the application of a suitable pumping signal;
   amplitude modulating the pumping signal in response to input information; and simultaneously
   maintaining the modulation power and modulation frequency so that phase-locking of the modulation signal and the laser output is prevented.

2. The method according to claim 1 wherein:
   said semiconductor laser is a PN junction laser;
   said spontaneous pulsing is induced by the application of a DC voltage; and
   said amplitude modulation is produced by an AC voltage source.

3. The method of claim 1 wherein said maintaining step includes maintaining the modulation power less than the minimum power required for said phase-locking to occur at the highest frequency of the form $1/M\nu_R$ contained within the bandwidth of said information signal, where M is an integer.

4. The method according to claim 3 wherein said maintaining step includes the steps of:
   fixing the DC operating point of said laser,
   measuring the response of said laser to variations in modulation power versus modulation frequency, thereby determining the operating regions of said laser in which the pulsing laser output phase locks to the modulating signal,
   determining the highest frequency of the form $1/M\nu_R$ contained within the bandwidth of said input information where $M$ is an integer,
   measuring the minimum modulation power required to produce said phase-locking at said frequency $1/M\nu_R$,
   maintaining said modulation power less than said minimum power.

5. The method of claim 1 wherein the highest frequency contained within the bandwidth of said input information is not greater than $1/2\nu_R$.

6. The method according to claim 1 including the steps of:
   fixing the DC operating point of said laser in a linear portion of the output frequency versus pumping signal characteristic of said laser.

7. The method according to claim 6 including the step of increasing the slope of said linear portion of said characteristic.

8. The method according to claim 5 wherein said slope increasing step comprising changing the temperature of said laser so as to effect said increase in slope.

9. The method according to claim 8 wherein:
   said semiconductor laser is a PN junction laser;
   said spontaneous pulsing is induced by the application of a DC voltage; and
   said amplitude modulation is produced by an AC voltage source.

10. The method according to claim 9 wherein said semiconductor laser is a gallium arsenide junction laser.

11. Apparatus for producing a pulse position modulated light signal comprising;
    a PN junction laser;
    injection current means for applying a DC voltage to said laser of sufficient value to produce self-induced pulsing at a repetition rate $\nu_R$ in the laser output;
    means for applying a lower power information signal to said laser to amplitude modulate its injection current, and for maintaining the power and frequency of said information signal so that phase-locking of said signal and said laser output is prevented.

12. The apparatus according to claim 11 wherein the modulation power is maintained less than the minimum power required for said phase-locking to occur at the highest frequency of the form $1/M\nu_R$, contained within the bandwidth of said information signal, where $M$ is an integer.

13. The apparatus of claim 12 wherein the highest frequency contained within the bandwidth of said information signal is not greater than $1/2\nu_R$.

14. The apparatus of claim 11 wherein the DC operating point of said laser is maintained in a linear portion of the output frequency versus injection current characteristic of said laser.

15. The apparatus of claim 14 including means for increasing the slope of said portion of said characteristic.

16. The apparatus of claim 15 wherein said increasing means comprise means for changing the temperature of said laser so as to effect said increase in slope.

* * * * *

UNITED STATES PATENT OFFICE
CERTIFICATE OF CORRECTION

Patent No. 3,628,023　　　　　　　　Dated December 14, 1971

Inventor(s) Thomas L. Paoli and Jose E. Ripper

It is certified that error appears in the above-identified patent and that said Letters Patent are hereby corrected as shown below:

Column 1, line 10, change "pulsing" to --Pulsing--.
Column 1, line 12, change "gaAs" to --GaAs--.
Column 1, line 65, change "DRAWing" to --DRAWING--.
Column 2, line 18, change "voltages" to --voltage--.
Column 2, line 49, change "modulation" to --modulating--.
Column 3, line 16, change "IF" to --If--.
Column 3, line 36, change "FIGs." to --FIG.--.
Column 3, line 39, change "varying" to --vary--.
Column 3, line 46, change "gaAs" to --GaAs--.
Column 4, line 13, change "arsenic" to --arsenide--.
Column 4, line 47, change "invention" to --invention.--.

Column 6, line 7, change "comprising" to --comprises--.

Signed and sealed this 4th day of July 1972.

(SEAL)
Attest:

EDWARD M. FLETCHER, JR.　　　　　　ROBERT GOTTSCHALK
Attesting Officer　　　　　　　　　Commissioner of Patents